Nov. 18, 1947.  W. H. HARRISON  2,431,172
ADJUSTABLE ADAPTER OR COUPLING
Filed April 11, 1946
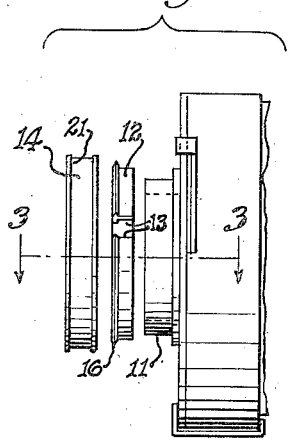
Fig. 2
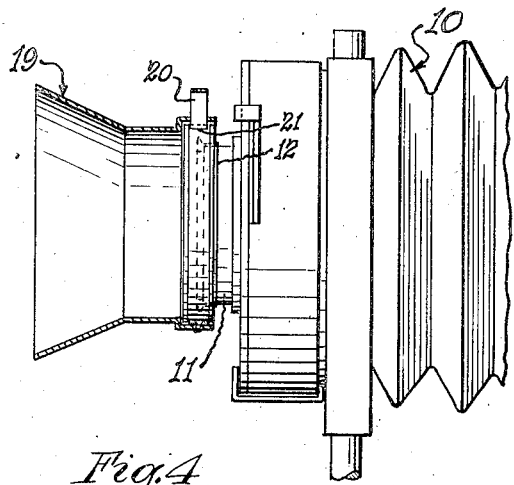
Fig. 1
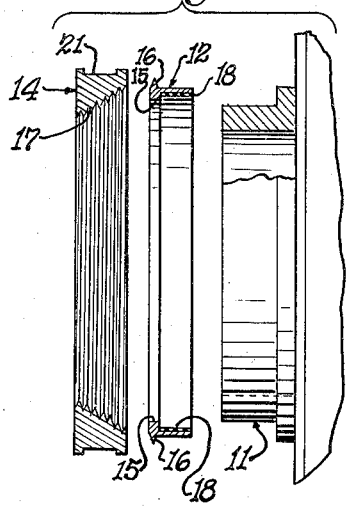
Fig. 3
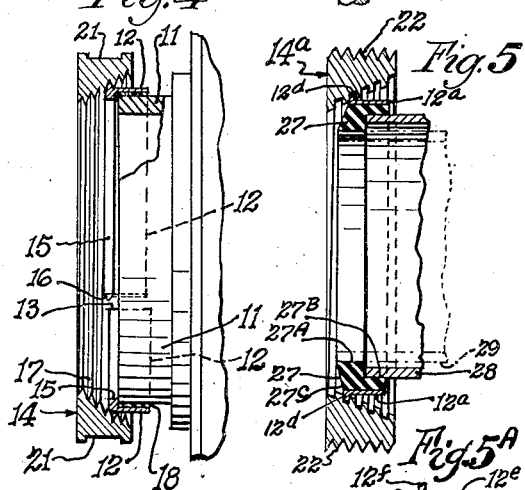
Fig. 4  Fig. 5
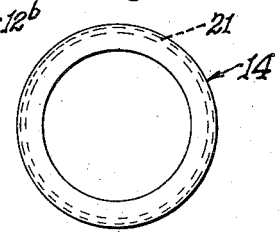
Fig. 5A
Fig. 8  Fig. 9  Fig. 6  Fig. 7
Inventor
William H. Harrison
by Frank J. Schraeder Jr.
Attorney.

Patented Nov. 18, 1947

2,431,172

UNITED STATES PATENT OFFICE 2,431,172

ADJUSTABLE ADAPTER OR COUPLING

William H. Harrison, Hollywood, Calif.

Application April 11, 1946, Serial No. 661,204

12 Claims. (Cl. 285—198)

1

Because of the many different sizes of lenses used in cameras, and the desire of camera owners to use various attachments, such as light filters, sunshades for the lenses, etc., an enormous stock of adapters must be kept on hand by dealers to enable them to supply the demand of each customer, regardless of the size of the lens mount in his camera.

The object of the present invention is primarily to make it possible for the dealer to supply the aforesaid demand from a much smaller stock of goods than he has heretofore been required to carry, or, in other words, a primary object of the invention is to provide a supporting member which is adapted to function as a supporting or retaining instrumentally for another device or instrumentally and which supporting member has a predetermined fixed outer diameter but is adjustably applicable for mounting on and for detachable connection to cylindrical members of a wide range of different diameters.

Viewing the invention on the basis of structure, it may be regarded as having for an object to produce a simple and novel adapter with which a lens shade or a light filter, or both, for example, may be attached to any lens barrel throughout a wide range of sizes, so that comparatively very few different sizes of adapters need be stocked to accommodate mounting of attachments on camera lenses of a wide range of diameters.

In carrying out my invention I employ a split or open clamping ring which is diametrically variable or contractible and thereby adapted to be clamped about any cylindrical lens barrel coming within definite upper and lower limits of a range of varying diameters; the tightening of the clamping ring being effected by a retaining member which functions as a mounting or supporting connector and is made in the form of an annular disk-like rigid ring which is adapted to carry the filter or other attachment. It is obvious that my improved adapter unit may have many other uses so that, viewed in another of its aspects, my invention may be said to have for its object to produce a simple and novel coupling adapted to be interposed between two cylindrical members of different diameters as, for example, conduits such as pipes or tubes.

Another object of my invention resides in the provision of an adapter of the kind described having a flexible clamping ring provided with multiple circular contact faces of relatively different diameters to thereby increase the range of adaptability of the device.

The various features of novelty whereby the

2 present invention is characterized will hereinafter be pointed out with particularity in the claims; but, for a full understanding of the invention and of its various objects and advantages, reference may be had to the following detailed description taken in connection with the accompanying drawing, wherein:

Fig. 1 is a side view of the front end portion of a camera having on the lens barrel thereof an adapter embodying the present invention, and there being shown in section a lens sunshade detachably mounted on the adapter;

Fig. 2 is a side view of the front end portion of the camera, together with the two members of the adapter positioned in coaxial relation with the lens barrel but spaced apart from the same and from each other;

Fig. 3 is a section, on a larger scale, on line 3—3 of Fig. 2;

Fig. 4 is a view similar to Fig. 3, but with the parts of the adapter assembled on the lens barrel;

Fig. 5 is an axial section through a modified adapter having a slightly modified form of the clamping ring and mounting member;

Fig. 5A is a cross-section through a clamping ring provided with multiple contact faces;

Figs. 6 and 7 are face views of respectively the mounting member and the clamping ring shown in Figs. 1 to 4, on the same scale as Figs. 1 and 2;

Fig. 8 is an axial section through a pipe coupled to a smaller pipe or conduit by means of a two-piece modified unit embodying the present invention, the clamping ring of the coupling unit being shown in elevation and the connector member in section; and Fig. 9 is a cross-section through the modified clamping ring shown in Fig. 8.

Referring to Figs. 1 to 4 and 6 and 7 of the drawing, 10 represents a front end portion of any usual camera having a lens barrel 11. Instead of mounting photographic attachments, such as color filters and sunshades, directly on the lens barrel, I support them on an adapter applied to the lens barrel 11. The preferred form of adapter comprises two pieces, a split or open clamping ring 12 which is adapted to embrace the lens barrel 11, and a retaining member 14 adapted to embrace the clamping ring 12 and contract it until it securely frictionally grips the lens barrel 11.

The clamping ring member 12 is preferably band-like in structure and in unrestrained normal position is split, as at 13 in Figs. 2, 4 and 7 and the material of which it is composed is flexible and comparatively thin and of suitable width in cross-section. The member 14 may be made of any suitable metal such as, for example, various aluminum alloys or steel and the clamping ring 12 is preferably made of a flexible metal such as, for example, a brass alloy. The clamping ring 12 is preferably provided along the outer edge thereof with a narrow internal flange 15 adapted to abut with the end of the lens barrel 11 to thereby facilitate accurately positioning the clamping ring 12 on the lens barrel, and, if so desired, to securely retain a color glass light filter (not shown) between the inner face of the flange 15 and the lens barrel. On the outer peripheral portion of the outer face of the clamping ring 12 is a screw thread element 16 which is shown in the form of a single ridge disposed in the same plane as the flange 15.

The annular member 14 is preferably in the form of a disk-like ring and preferably of thicker structure than the clamping ring 12 and is provided with a central bore which is frusto-conical and is screw-threaded, preferably throughout its entire length; the screw threads being designated by reference character 17, and being complementary to the thread element 16 on the clamping ring 12. Member 14 thus constitutes a tightening member or element adapted to be screw-connected with the clamping ring 12 which is adapted to enter into the large end of the frusto-conical screw-threaded bore.

To apply the adapter to the lens barrel 11 for support thereon of a photographic attachment such as a sunshade 19, the flexible clamping ring 12 is applied on the lens barrel 11 with the flange 15 brought up against the outer end of the lens barrel.

After the clamping ring 12 has been positioned on the lens barrel, the tightening member 14 is threadedly engaged with the ring and is turned to relatively draw the clamping ring 12 farther into the bore of member 14 so as to progressively contract the clamping ring 12 until it frictionally securely grips the lens barrel, as in Fig. 4.

To facilitate the threading of the clamping ring 12 into the bore of member 14 and permit its diameter to vary, it is preferable in certain instances as, for example, in the application of my adapter to the mounting of various photographic attachments on a camera lens barrel, that the length of the thread element 16 be not more than a single turn, namely, preferably less than 360° in angular length, as shown in Figs. 2 and 7, because the clamping ring 12 need not necessarily engage the complete circumference of the lens barrel 11 to provide adequate friction for securely holding the adapter unit on the lens barrel 11.

In certain adaptations or uses the split clamping ring 12 may be made of comparatively thin flexible material and in its unrestrained diameter form a complete circle and such thin clamping ring may be employed in certain instances where a complete circumferential engagement of the adapter unit is desirable as, for example, where the adapter unit is used for connecting two conduits of relatively different diameters. For such and the like uses, the split clamping ring is made of comparatively thin flexible material so that it can readily overlap at its end portions as it continues to reduce its diameter and assumes a spiral shape within the frusto-conically threaded member under the relative rotation of the two elements of the adapter unit. A connector unit of this type adapted for connecting conduits of relatively different diameters is illustrated in Figs. 8 and 9 wherein a conduit 23 is connected to a relatively diametrically smaller conduit 24 by a two-piece adapter unit consisting of the retaining connector 14$^b$ screw-threaded into an end of the larger conduit 23, as at 25, while the clamping ring 12$^b$ frictionally engages the smaller conduit 24 with its ends and thread element 12$^c$ in overlapping position while constricted within the threaded bore 17$^b$. The thread element 12$^c$ may consist of a peripheral right-angularly bent flange 12$^c$, as more clearly shown in the cross-section of the clamping ring 12$^b$ in Fig. 9.

In other words, the adapter in this instance serves as a connector or coupling between two conduits, the diameter of one being fixed while the other may have any diameter within the range of the axial diameter of the threaded frusto-conical bore of member 14$^b$, the holes 26 in the exposed face thereof, in this instance, adapt same to the use of a spanner wrench for screwing the member 14$^b$ securely into the larger conduit 23.

The adapter will fit any lens barrel the diameter of which lies somewhere between the large and the small diameters of the screw-threaded bore. In the particular illustrative arrangement shown, the clamping ring 12 must be drawn about half way through the threaded bore of member 14 before it grips the lens barrel 11 so firmly that it practically cannot contract further. Therefore, as illustrated, this particular lens barrel 11 has a diameter which approaches the medial one of the range of barrel diameters to which the particularly illustrated adapter may be applied and therefore a comparatively few additional sizes of adapters will readily accommodate a comparatively great number of lens barrels of varying diameters so that a dealer may carry a stock of very few adapters.

Since there is nothing except friction to prevent displacement of the clamping ring 12 from the lens barrel 11, the friction may be increased, in instances where so desired, by lining the clamping ring 12 with a material suitable for that purpose as, for example, a thin strip of rubber or the like which may be vulcanized to the inner face of the clamping ring 12, such a strip 18 being shown in Figs. 3 and 4, however, a metal to metal contact between the clamping ring 12 and lens barrel 11 has usually been found satisfactory.

The ratio of the friction between the inner face of the clamping ring 12 and the lens barrel 11 and the thread 16 on the clamping ring 12 and the screw threads of the frusto-conical member 14 should preferably be such that when the clamping ring is first manually adjusted close to or about to the desired diameter of, for example, the lens barrel 11 to which the unit is to be applied, it will then fit snugly over the lens barrel and remain in such applied position so that the frusto-conically threaded member may then be turned without holding the clamping ring and permit the conical threads to tighten down and only slightly reduce the diameter of the clamping ring to tightly secure it to the lens barrel.

Conversely, when the clamping ring is to be unloosened, the frusto-conically threaded member may readily be rotated in reverse direction due to the friction between it and the clamping ring being less than the friction between the clamping ring and lens barrel whereupon the loosening of the clamping ring will readily permit the retaining member to expand as the rotation of the retaining member is advanced.

The device that is to be attached to the lens barrel 11 by the adapter is mounted in any suitable way on the retaining member 14 of the latter. In the arrangement shown in Fig. 1, the device is a well known sunshade 19 and similarly a color filter (not shown) may be readily mounted directly on such retaining member 14. The tubular end of the sunshade 19 is slipped over the member 14, with the customary resilient securing loop element 20 thereof embracing the member 14 and gripping the peripheral portion of a circular seat of a shallow recess or channel 21 extending around the member 14; the width of the channel 21 being about equal to the width of the flat spring material of which the loop element 20 is made. The retaining member 14 may, however, be provided with other peripheral conformations for attaching devices thereto. Thus, in Fig. 5, the member 14ᵃ is provided with screw threads 22 to allow an attachment to be screw-mounted upon the same.

In Figs. 5 and 5ᴬ, I illustrate a modification of my adapter wherein the retaining member 14ᵃ is shown provided with screw threads 22 for mounting within the threaded end of a cylindrical conduit, as for example, the conduit 23 in Fig. 8, however, it is obvious that such retaining member 14ᵃ could be peripherally channeled, as at 21 in Figs. 2, 3 and 4, to support thereon the desired photographic attachment.

The main modifications in Fig. 5 consist in providing the frusto-conical bore of the member 14ᴬ with threads having parallel side walls adapted to receive the complementary thread element 12ᵈ of the flexible clamping ring 12ᵃ, the side walls of which thread element 12ᵈ are likewise parallel. This particular thread arrangement offers a somewhat stronger and more rigid connection between the retainer 14ᵃ and the clamping ring 12ᵃ although the ordinary V-shaped thread, as shown in Figs. 3 and 4, has been found satisfactory for photographic attachment use.

In addition to the modified form of thread element 12ᵃ, the split or open clamping ring 12ᵃ is equipped with a liner 27 which is provided with multiple circular gripping faces 27ᴬ and 27ᴮ of relatively different diameters to still further widen the range of applicability of the adapter to cylindrical members of different diameters. With the clamping ring 12ᵃ as shown in the position in Fig. 5 it is adapted to grip either one of the two diametrically different tubular members 28 and 29, the member 29 being shown in dot and dash lines.

The liner 27 may be made of any flexible material, such as rubber, vulcanized or otherwise secured to the inner face of the clamping ring 12ᵃ which, like the clamping ring 12 shown in Figs. 1 to 4, is made of any suitable thin resilient and flexible metal as steel or brass alloy.

In order to retain the width of the split ring 12ᵃ within a desired minimum and to provide fairly wide gripping faces 27ᴬ and 27ᴮ and to distribute the force transmitted through and from the marginal thread element 12ᵈ more effectively over the comparatively wide area of the contact face 27ᴬ, the outer face 27ᶜ of the liner 27 is angularly disposed at an obtuse angle relatively to the laterally disposed flange of the metallic ring 12ᵃ to thereby distribute the compressive force of the retaining member 14ᵃ substantially centrally of the width of the face 27ᴬ and to thus stabilize the liner against a possible tendency to wabble and this inclined wall-like structural feature is effective to assist in stabilizing the liner 27 when the adapter is applied to a cylindrical object engaged by the circular contact face 27ᴮ.

Fig. 5ᴬ shows a cross-section of a modified metallic clamping ring 12ᵉ having a marginally disposed thread element 12ᶠ and a pair of contact faces 12ᵍ and 12ʰ formed on relatively slightly different diameters adapted to engage a cylindrical object 30 having a likewise relatively offset cylindrical exterior face.

It is obvious that the adapter may be applied to any suitable cylindrical object by first manually adjustably screwing the clamping ring 12 into the retaining member 14 until the desired approximate inner diameter of the clamping ring 12 is attained whereupon the assembled unit may then be slipped onto the object and the retaining member 14 then tightened to thus secure the adapter unit to the object.

In the claims, I define the member 14 as a retaining member because in its varied adaptations and uses it functions in a sense as such. For example, it directly retains the sunshade or filter on the camera lens barrel. In other instances, the member 14 retains one end of a conduit within an end of another conduit.

While I have illustrated and described with particularity only a single preferred form of my invention, together with a few modifications in details, I do not desire to be limited to the exact details thus illustrated and described; but intend to cover all forms and arrangements coming within the scope of my invention as defined in the appended claims.

I claim:

1. A unit of the kind described consisting of a member and an open ring of wide, thin, flexible, band-like material adapted to clampingly grip an object to thereby secure said member thereto, said member containing a frusto-conical screw-threaded bore, and said open ring having on the periphery thereof means to engage the screw threads in said bore when said ring is entered in the large end of said bore, said ring being caused to contract upon relative rotation between said member and said ring in the direction to cause said ring to move farther into said bore.

2. A unit of the kind described consisting of a rigid member and an open ring of wide, thin, flexible, band-like material adapted to clampingly grip an object to thereby secure said member thereto, said member containing a frusto-conical screw-threaded bore, and said open ring having at one edge a single external screw thread element whose angular length does not exceed 360° when said ring is closed, the parts being so proportioned that said ring may be inserted in the large end of said bore and be contracted by causing it to be screwed toward the small end of the bore.

3. A unit as set forth in claim 2, wherein said screw thread element on the ring is a ridge adapted to enter the valley in the screw thread in said bore.

4. In a device of the kind described and in combination, a member adapted to be secured to a second member, said first member containing a frusto-conical screw-threaded bore, and a split ring of wide, thin, flexible, band-like material within said bore adapted to engage and surround said second member, said ring having along one edge an external element constituting a single male thread complementary to the thread in said bore and an internal element serving as a stop to limit the entry of said second member into the same, said ring being adapted to be constricted to grip said second member upon a relative rotation between said member and said ring in a direction to cause said ring to move farther into said bore.

5. In a device of the kind described and in combination, a member adapted to be secured to a second member, said first member containing a frusto-conical screw-threaded bore and including a split flexible ring within said bore adapted to engage and partially surround said second member, said ring having at one edge an external ridge constituting a male thread complementary to the thread in the said bore and normally when unrestrained being less than one complete turn in length, the maximum outer diameter of said flexible ring being less than the inner diameter of the large end of said bore and said flexible ring being adapted to contract to clampingly grip said second member when said member is rotated, in the proper direction, relatively to said flexible ring to cause said ring to move farther into said bore.

6. An adapter as set forth in claim 5, wherein said ring is lined with a relatively softer material to increase the effectiveness of its frictional grip on an object about which said ring is tightened through said relative rotation.

7. An adapter as set forth in claim 5, wherein said ring is lined with a rubber-like material.

8. An adapter as set forth in claim 4, wherein said member has a screw-threaded periphery.

9. A unit as set forth in claim 1, wherein the threads of said frusto-conical bore have parallel opposite sides and said peripheral means on said ring consists of a male thread having parallel opposite sides.

10. In a device of the kind described as set forth in claim 5 and wherein said flexible ring consists of comparatively thin flexible material having a cross-sectionally unilateral circular inner face and is provided with a circular flexible inner liner of relatively softer material than the material of said ring, said liner having a pair of relatively diametrically offset circular contact faces formed on relatively different radii.

11. A device as set forth in claim 5, wherein said flexible ring is provided along its inner face with a circular flexible inner liner having at least two relatively diametrically offset contact faces and the combined width of said contact faces being greater than the width of said ring whereby at least one circularly disposed side of said liner is inclined outwardly from the inner face of said ring at an obtuse angle.

12. A device as set forth in claim 5, wherein said flexible ring consists of comparatively thin flexible metal having a pair of relatively diametrically offset inner faces, and wherein said external ridge consists of an outwardly rightangularly bent circularly disposed flange along that edge of said ring where the smaller diameter occurs.

WILLIAM H. HARRISON.

REFERENCES CITED

The following references are of record in the file of this patent:

UNITED STATES PATENTS

| Number | Name | Date |
|---|---|---|
| 1,487,536 | Campau | Mar. 18, 1924 |
| 2,006,520 | Stone | July 2, 1935 |
| 2,372,223 | Nagel | Mar. 27, 1945 |
| 2,396,491 | Chamberlain | Mar. 12, 1946 |

FOREIGN PATENTS

| Number | Country | Date |
|---|---|---|
| 699,057 | Great Britain | Oct. 24, 1940 |